United States Patent
Wei

(10) Patent No.: US 10,313,889 B2
(45) Date of Patent: Jun. 4, 2019

(54) METHOD OF SHARING RADIO RESOURCES FOR LICENSED ASSISTED ACCESS IN UNLICENSED SPECTRUM AND RELATED DEVICES USING THE SAME

(71) Applicant: Acer Incorporated, New Taipei (TW)

(72) Inventor: Hung-Yu Wei, New Taipei (TW)

(73) Assignee: Acer Incorporated, New Taipei (TW)

( * ) Notice: Subject to any disclaimer, the term of this patent is extended or adjusted under 35 U.S.C. 154(b) by 520 days.

(21) Appl. No.: 14/929,408

(22) Filed: Nov. 1, 2015

(65) Prior Publication Data
US 2016/0205562 A1    Jul. 14, 2016

Related U.S. Application Data

(60) Provisional application No. 62/103,064, filed on Jan. 13, 2015.

(51) Int. Cl.
| | | |
|---|---|---|
| *H04W 16/14* | (2009.01) | |
| *H04W 74/08* | (2009.01) | |
| *H04W 72/00* | (2009.01) | |

(52) U.S. Cl.
CPC ............ *H04W 16/14* (2013.01); *H04W 72/00* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 9,825,748 B2* | 11/2017 | Liang | .................. H04W 28/085 |
| 2013/0272260 A1 | 10/2013 | Bitran et al. | |
| 2014/0050146 A1 | 2/2014 | Chrisikos et al. | |

(Continued)

FOREIGN PATENT DOCUMENTS

| | | |
|---|---|---|
| CN | 103369588 | 10/2013 |
| CN | 103858508 | 6/2014 |

(Continued)

OTHER PUBLICATIONS

Ericsson et al., "Study on Licensed-Assisted Access using LTE," 3GPP TSG RAN Meeting #65, RP-141664, Sep. 9-12, 2014, pp. 1-8.

(Continued)

*Primary Examiner* — Lester G Kincaid
*Assistant Examiner* — Frank E Donado
(74) *Attorney, Agent, or Firm* — JCIPRNET

(57) ABSTRACT

A method of sharing radio resources for licensed assisted access (LAA) in unlicensed spectrum and related devices using the same are provided. In one of the exemplary embodiments, the disclosure is directed to a method used by a user equipment for sharing radio resources for LAA in an unlicensed spectrum. The method would include not limited to transmitting or receiving, through a LTE protocol, a first data in a licensed spectrum; transmitting or receiving, through the LTE protocol, a first control signal in the licensed spectrum for receiving a second data in an unlicensed spectrum; transmitting or receiving, through a LTE-unlicensed (LTE-U) protocol, the second data in the unlicensed spectrum within a first time window without transmitting a random access (RA) request; and stopping transmitting, through a Wi-Fi protocol, any RA request as long as the first time window has not expired.

15 Claims, 10 Drawing Sheets

(56) References Cited

U.S. PATENT DOCUMENTS

2015/0056931 A1    2/2015  Yerramalli et al.
2015/0223115 A1*   8/2015  Liang .................. H04W 28/085
                                                           370/235
2017/0105218 A1*   4/2017  Tabet .................... H04W 72/12

FOREIGN PATENT DOCUMENTS

EP    3113530       1/2017
WO    2013133911    9/2013

OTHER PUBLICATIONS

Qualcomm Technologies, Inc.,"Qualcomm Research LTE in Unlicensed Spectrum: Harmonious Coexistence with Wi-Fi", Jun. 2014, pp. 1-19.

* cited by examiner

METHOD OF SHARING RADIO RESOURCES FOR LICENSED ASSISTED ACCESS IN UNLICENSED SPECTRUM AND RELATED DEVICES USING THE SAME

CROSS REFERENCE TO RELATED APPLICATION

This application claims the priority benefit of U.S. provisional application Ser. No. 62/103,064, filed on Jan. 13, 2015. The entirety of the above-mentioned patent application is hereby incorporated by reference herein and made a part of specification.

TECHNICAL FIELD

The present disclosure is directed to a method of sharing radio resources for licensed-assisted access (LAA) in an unlicensed spectrum and related devices using the same method.

BACKGROUND

Conventionally, a wireless communication system operates in a proprietary radio frequency (RF) spectrum in which base stations and wireless terminals communicate through the proprietary RF spectrum licensed to a wireless operator. However, there have been discussions of wireless communication systems expanding usages to unlicensed spectrum, such as the Industrial, Scientific and Medical RF spectrum (ISM band) or other free spectrum. The possibilities of Long Term Evolution (LTE) or LTE-advanced communication systems entering the domain of the unlicensed spectrums have drawn attention for telecommunication equipment vendors and operators. One reason for such interest is the potential overcrowding of licensed spectrums. In order to provide high throughput services to more users, incursions into unlicensed spectrums might deliver benefits for wireless communication systems.

In 2014 September, a new study item, namely "*Study on Licensed-Assisted Access using LTE*" was approved for investigations related to 3GPP Release 13. The framework for Licensed-Assisted Access (LAA) to unlicensed spectrum has also been known as Unlicensed LTE (LTE-U), which may potentially be a key feature for the next generation cellular system.

One of the challenges of a wireless communication system operating in unlicensed spectrum is to operate within an environment of uncertainty under which devices belonging to the wireless communication system have to co-exist with devices that are not controlled by the wireless communication system. For example, assuming that a LTE communication system conducts a wireless communication in an unlicensed or shared spectrum, there might be other communications devices, either using the same radio access technology or different radio access technologies, which would like to also share the same unlicensed spectrum. The sharing of unlicensed spectrum might cause mutual interferences or contentions. At this point in time, it would be highly conceivable that LTE operations that transpire in unlicensed spectrum would need to cope with problems related to the operation of Wi-Fi radios within the same unlicensed spectrum.

Therefore, a method and related device that provides an adequate solution for sharing radio resources in an unlicensed spectrum might be required.

SUMMARY OF THE DISCLOSURE

Accordingly, the disclosure is directed to a method of sharing radio resources for licensed-assisted access (LAA) in an unlicensed spectrum and related devices using the same method.

In one of the exemplary embodiments, the disclosure is directed to a method used by a user equipment for sharing radio resources for licensed-assisted access (LAA) in an unlicensed spectrum. The method would include not limited to transmitting or receiving, through a LTE protocol, a first data in a licensed spectrum; transmitting or receiving, through the LTE protocol, a first control signal in the licensed spectrum for receiving a second data in an unlicensed spectrum; transmitting or receiving, through a LTE-unlicensed (LTE-U) protocol, the second data in the unlicensed spectrum within a first time window without transmitting a random access (RA) request; and stopping transmitting, through a Wi-Fi protocol, any RA request as long as the first time window has not expired.

In one of the exemplary embodiment, the disclosure is directed to a method used by a base station for sharing radio resources for licensed-assisted access (LAA) in an unlicensed spectrum. The method would include not limited to transmitting, through an inter-base station interface, a first control signal to configure a contention free period for transmitting or receiving in an unlicensed spectrum without any contention; transmitting, through a LTE protocol, a second control signal for transmitting or receiving in the unlicensed spectrum without any contention; transmitting or receiving within the contention free period in the unlicensed spectrum; and stopping any transmitting or receiving wirelessly in the unlicensed spectrum outside the contention free period.

In one of the exemplary embodiment, the disclosure is directed to a method used by a Wi-Fi access point (AP) for sharing radio resources for licensed-assisted access (LAA) in an unlicensed spectrum. The method would include not limited to receiving, through an inter-base station interface, a first control signal to configure a contention free period for transmitting or receiving in an unlicensed spectrum without any contention; transmitting, through a Wi-Fi interface, a second control signal indicating a start of the contention free period during which no random access (RA) request is processed; receiving, through the Wi-Fi interface, a RA request for a contention after the contention free period has expired; and serving the RA request in response to the contention being successful.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
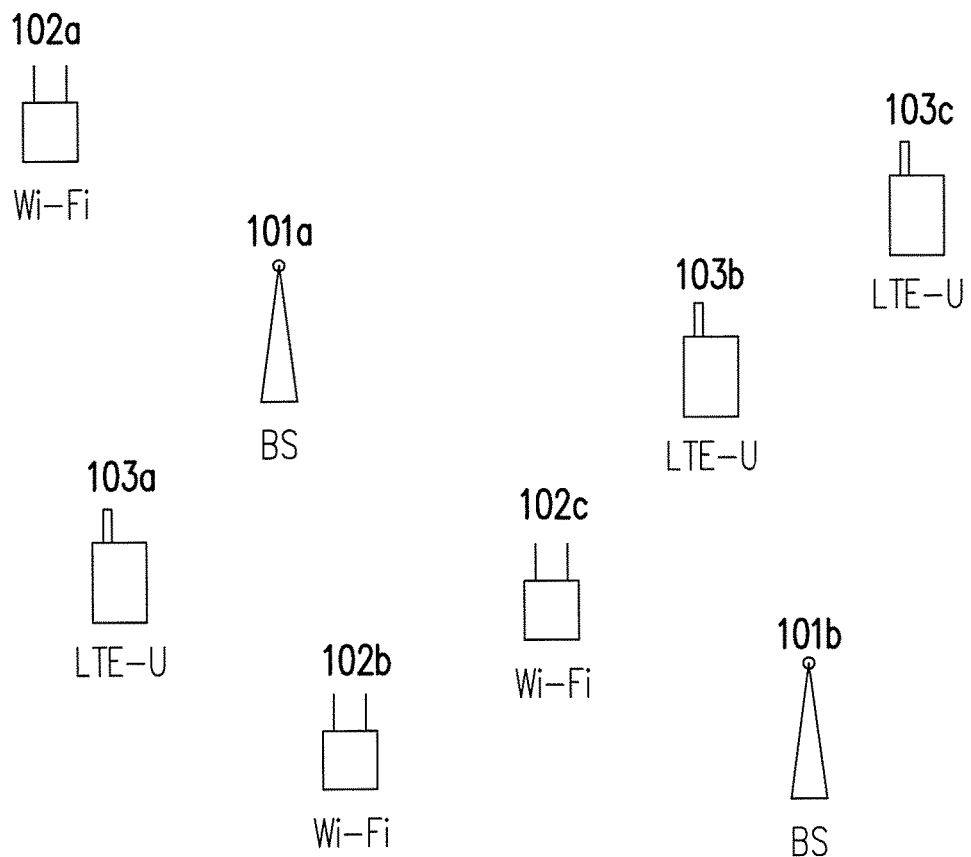
FIG. 1 illustrates an exemplary communication system having not limited to LTE-U and Wi-Fi operations that share an unlicensed spectrum.

Reference will now be made in detail to the present exemplary embodiments of the disclosure, examples of which are illustrated in the accompanying drawings. Wherever possible, the same reference numbers are used in the drawings and the description to refer to the same or like parts.

In a LTE system, a time frame/sub-frame structure could be utilized to allocate OFDMA radio resources in both time domain and frequency domain. Although LTE-U radio is in active communication in a shared spectrum or an unlicensed spectrum, signals of other radio access technologies (RATs) such as Wi-Fi transmitted in the same shared spectrum or the unlicensed spectrum may interfere with the LTE-U signals. The radio resources of the shared spectrum or the unlicensed spectrum may compete with Wi-Fi signals while LTE-U is in active communications. Therefore, a mechanism to reduce (or even avoid) Wi-Fi contention during LTE-U communications time frame/sub-frames may greatly enhance the LTE-U system performance as the technology currently stands.

The communication efficiency of LTE-U may improve if a mechanism is applied to reduce the collision from other RATs such as Wi-Fi in the unlicensed spectrum. As LTE-U and Wi-Fi share the same spectrum, it could be inefficient for other Wi-Fi devices to initiate random access based contention while LTE-U is in active communications. The proposed mechanism of the disclosure could be used to reserve shared spectrums for the upcoming active LTE-U communication period in order to reduce (or even avoid) Wi-Fi based random access contention during this period.

In the proposed design, one of the purposes is to provide a solution for signaling and configuration methodology for spectrum-sharing radio access technologies such as Wi-Fi and LTE-U. Notice that the disclosure could be applied to ensure the co-existence among Wi-Fi and Unlicensed LTE or other unlicensed cellular wireless communication systems, for example, a 5G radio that supports unlicensed operation. The present disclosure may also be applied to other inter-RAT for shared spectrum.

In view of the aforementioned descriptions, the disclosure is suitable for being used in a wireless communication system and is able to share radio resources for licensed-assisted access (LAA) in an unlicensed spectrum.

FIG. 1 illustrates an exemplary communication system having not limited to LTE-U and Wi-Fi operations that share an unlicensed spectrum. Referring to FIG. 1, a communication system 100 could include not limited to base stations (BSs) 101*a* and 101*b*, Wi-Fi devices 102*a*~102*c* and LTE-U devices 103*a*~103*c*. The Wi-Fi devices 102*a*~102*c* and the LTE-U devices 103*a*~103*c* may be existed within a service coverage area of the BS 101*a* and/or the BS 101*b*, and be served by the BS 101*a* or the BS 101*b*. The BSs 101*a* and 101*b* may have a capability of handling for example but not limited to both LTE-U and Wi-Fi operations. It should be noted that a LTE operation may be work along with LTE-U protocol by the BS 101*a* or the BS 101*b*. For example, the BS 101*a* may provide control signaling for activating LTE-U data transmission through LTE protocol in the licensed spectrum.

It should be noted that FIG. 1 only shows a quantity of one for each network element for the reason of brevity as in actual practice the proposed communication system would actually involve a rather large quantities of Wi-Fi devices, LTE-U devices, and BSs.

The term "base station" (BS) such as the BS 101*a* and 101*b* in this disclosure could represent various embodiments which for example could include but not limited to a Home Evolved Node B (HeNB), an eNB, a node B, a macro BS, a pico BS, an advanced base station (ABS), a base transceiver system (BTS), an access point (AP), a home base station, a relay station, a scatterer, a repeater, an intermediate node, an intermediary, and/or satellite-based communications base stations.

The term "user equipment" (UE) such as LTE-U devices 103*a*~103*c* in this disclosure could represent various embodiments which for example could include but not limited to a mobile station (MS), an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

Figure 2A:
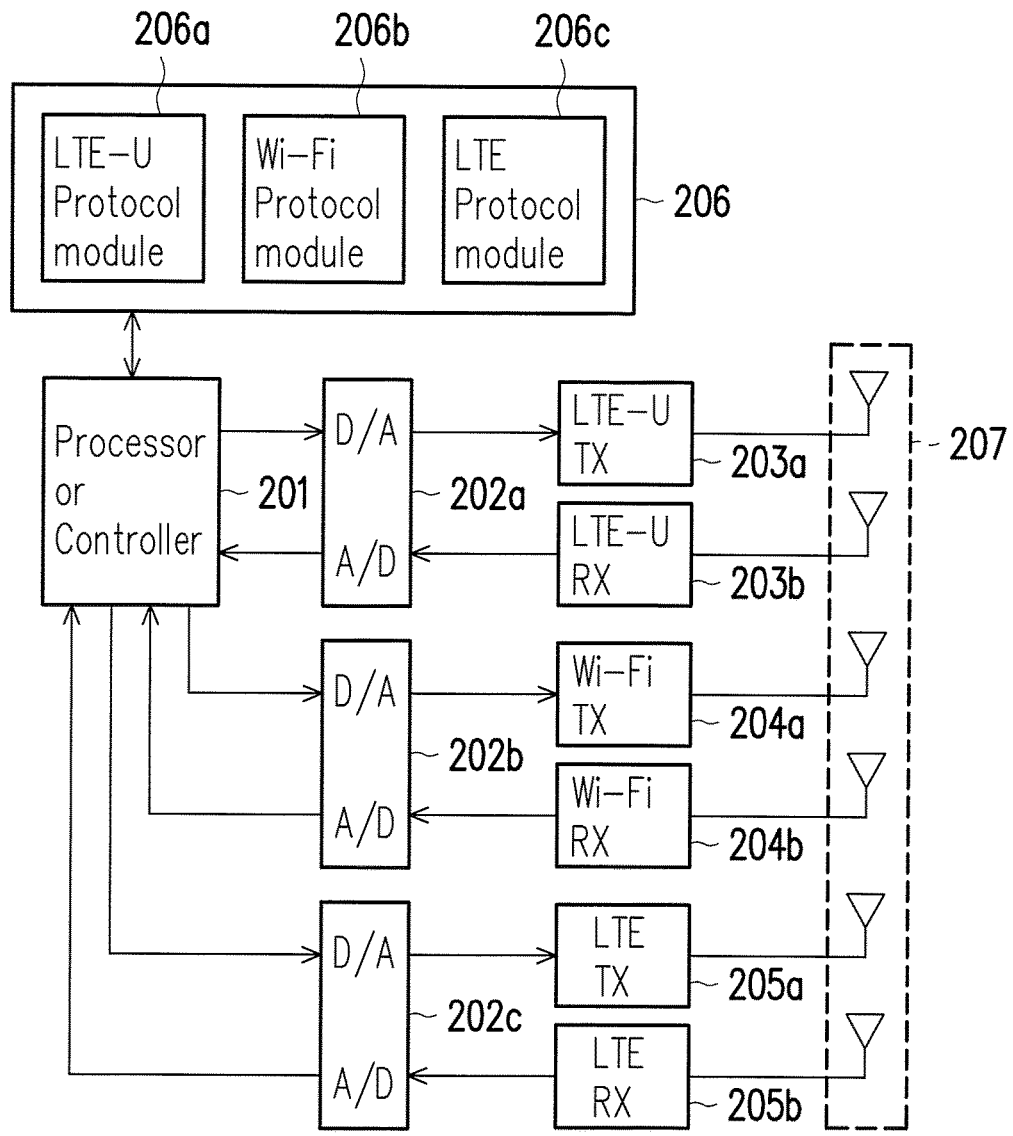
FIG. 2A illustrates a LTE-U compatible wireless device in terms of hardware functional block diagram in accordance with one of the exemplary embodiments of the disclosure.

From the hardware perspective, a wireless device such as the BS and the UE may be represented by at least the functional elements as illustrated in FIG. 2A in accordance with an embodiment of the present disclosure. Referring to FIG. 2A, the wireless device 200 would include at least but not limited to a processor and/or a controller 201 (hereinafter referred to as "processor 201"), one or more digital-to-analog (D/A)/analog-to-digital (A/D) converters 202a~202c, optionally a LTE-U transmitter (TX) 203a and a LTE-U receiver (RX) 203b, a Wi-Fi TX 204a and a Wi-Fi RX 204b, a LTE TX 205a and a LTE RX 205b, a memory module 206, and antennas 207.

The processor 201 is configured to process digital signal and to perform procedures of the proposed method of sharing radio resources described in the following in accordance with exemplary embodiments of the present disclosure. Also, the processor 201 may be coupled to a memory module 206 to store software programs such as a LTE-U protocol module 206a, a Wi-Fi protocol module 206b, and a LTE protocol module 206c, programming codes, device configurations, a codebook, buffered or permanent data, and so forth. The processor 201 is configured to access and execute the modules recorded in the memory module 206. The functions of the processor 201 could be implemented by using programmable units such as a micro-processor, a micro-controller, digital signal processor (DSP) chips, a field-programmable gate array (FPGA), etc. The functions of the processor 201 may also be implemented with separate electronic devices or ICs, and functions performed by the processor 201 may also be implemented within the domains of either hardware or software.

The LTE-U protocol module 206a would support LTE-U protocol. That means the processor 201 executed the LTE-U protocol module 206a would convert a digital message into a format that is compatible with LTE-U protocol, and could access the cellular network such as Evolved Universal Terrestrial Radio Access Network (E-UTRAN). The Wi-Fi protocol module 206b would support 802.11 (or Wi-Fi) protocol. That means the processor 201 executed the Wi-Fi protocol module 206b would convert a digital message into a format that is compatible with Wi-Fi protocol according to the IEEE 802.11 standard or similar standards such as IEEE 802.11x, and could access the wireless local access network (WLAN). The LTE protocol module 206c would support LTE protocol. That means the processor 201 executed the LTE protocol module 206c would convert a digital message into a format that is compatible with LTE protocol, and could access the cellular network such as E-UTRAN. Notice that the LTE protocol module 206c may be optionally combined with 3G and/or 2G protocol module.

In addition, the processor 201 of the BS may be used to coordinate different RATs. For example, the processor 201 of the BS may coordinate two or more RATs such as radio operations of Wi-Fi and LTE-U using the same unlicensed spectrum. The processor 201 of the BS may coordinate radio technologies such as radio operation LTE using licensed spectrum and unlicensed spectrum. A UE may communicate with a BS using both licensed spectrum and unlicensed spectrum.

It should be noticed that the BS may operate as a combination of at least two devices. One device such as an eNB is used for handling the LTE and LTE-U operations, and another device such as a Wi-Fi AP for handling the Wi-Fi operation. The two devices of the BS may have their own processor or controller, and have an inter-base station interface between two devices for exchanging control signals between the LTE and LTE-U operations and the Wi-Fi operation. The inter-base station interface may be for example but not limited to cable, fiber, or radio interface. For example, a control signal may be used for configuring a contention free period in the unlicensed spectrum.

In another embodiment, the BS may operate as a traditional BS but with LTE-U capability. The processor 201 of the BS may be used for handling all LTE, LTE-U, and Wi-Fi operations, and include an inter-base station interface for exchanging control signals of a coordinating configuration between each two protocol modules of the LTE-U protocol module 206a, the Wi-Fi protocol module 206b, and the LTE protocol module 206c. The inter-base station interface may be a physical or virtual line established by cable or software.

The D/A/A/D converters 202a~202c is configured to convert from an analog signal format to a digital signal format during uplink signal processing and from a digital signal format to an analog signal format during downlink signal processing.

The LTE-U TX 203a and the LTE-U RX 203b operated at an unlicensed spectrum such as 5 GHz, 2.4 GHz, other Industrial, Scientific and Medical (ISM) radio bands, or Unlicensed National Information Infrastructure (U-NII) band are respectively used for transmitting and receiving modulated signals which could be wireless RF signals (through one or more antennas 207) for LTE-U protocol module 206a. The Wi-Fi TX 204a and the Wi-Fi RX 204b operated at the unlicensed spectrum are respectively used for transmitting and receiving modulated signals which could be wireless RF signals (through one or more antennas 207) for Wi-Fi protocol module 206b. The unlicensed spectrum operated by the LTE-U TX 203a, the LTE-U RX 203b, Wi-Fi TX 204a, and the Wi-Fi RX 204b may be the same or different. In addition, the LTE-U TX 203a, the LTE-U RX 203b, Wi-Fi TX 204a, and the Wi-Fi RX 204b may be used for sensing the transmission (of other devices such as Wi-Fi devices 102a~102c and LTE-U devices 103a~103c) in the unlicensed spectrum. The LTE TX 205a and the LTE RX 205b operated at a licensed spectrum such as frequency bands 700, 850, 1800, 1900, 2100 MHz, and etc are respectively used for transmitting and receiving modulated signals which could be wireless RF signals (through one or more antennas 207) for LTE protocol module 206c. The LTE-U TX 203a and the LTE-U RX 203b, the Wi-Fi TX 204a and the Wi-Fi RX 204b, and the LTE TX 205a and the LTE RX 205b may also perform operations such as low noise amplifying, impedance matching, frequency mixing, up or down frequency conversion, filtering, amplifying, and so like.

The memory module 206 may be a fixed or a movable device in any possible forms including non-transitory computer readable recording medium such as a random access memory (RAM), a read-only memory (ROM), a flash memory or other similar devices, or a combination of the above-mentioned devices.

The Wi-Fi device such as the Wi-Fi devices 102a~102c in this disclosure could represent various embodiments which for example could include but not limited to a desktop computer, a laptop, a computer, a server, a client, a workstation, a personal digital assistant (PDA), a tablet personal computer (PC), a scanner, a telephone device, a pager, a camera, a television, a hand-held video game device, a musical device, a wireless sensor, and so like. In some applications, a Wi-Fi device may be a fixed computer device operating in a mobile environment, such as a bus, train, an airplane, a boat, a car, and so forth.

Figure 2B:
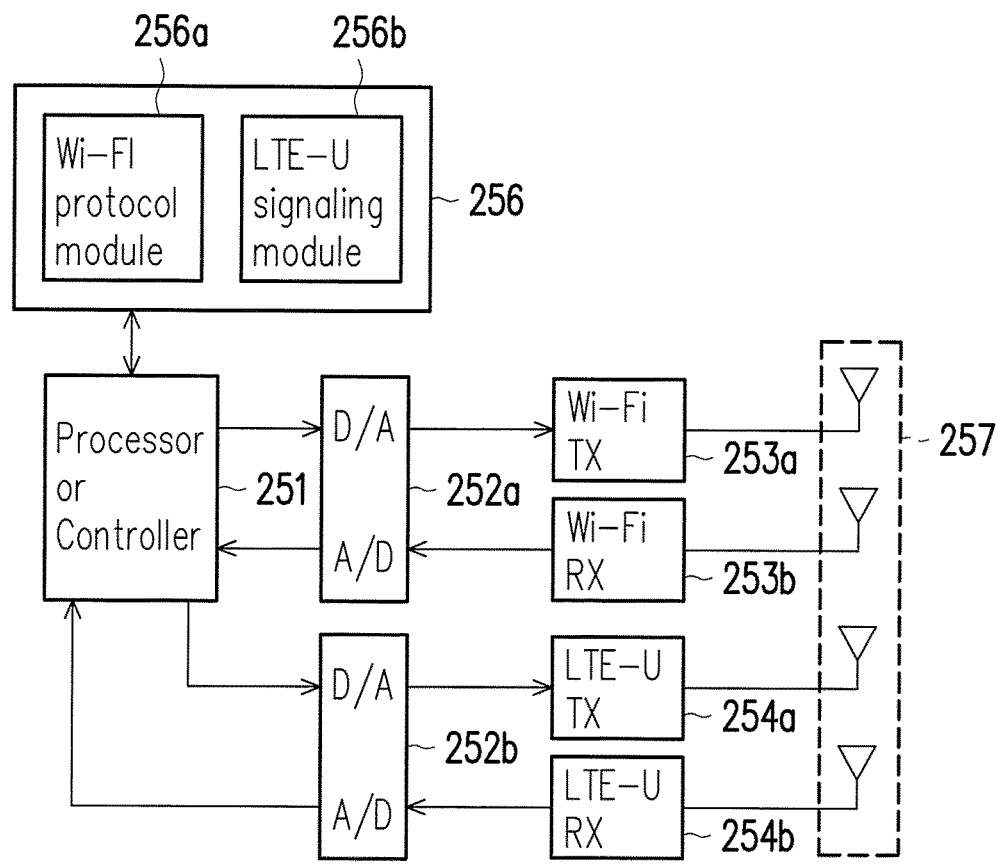
FIG. 2B illustrates a LTE-U compatible Wi-Fi access point (AP) in terms of hardware functional block diagram in accordance with one of the exemplary embodiments of the disclosure.

In another embodiment of the present disclosure, BSs 101*a* and 101*b* in the communication system 100 would be substituted by a Wi-Fi access point (AP). From the hardware perspective, the Wi-Fi AP may be represented by at least the functional elements as illustrated in FIG. 2B in accordance with an embodiment of the present disclosure. Referring to FIG. 2B, the Wi-Fi AP 250 would include at least but not limited to a processor and/or a controller 251 (hereinafter referred to as "processor 251"), one or more D/A/A/D converters 252*a*~252*b*, a Wi-Fi TX 253*a* and a Wi-Fi RX 253*b*, optionally a LTE-U TX 254*a* and a LTE-U RX 254*b*, a memory module 256, and antennas 257.

The processor 251 is configured to process digital signal and to perform procedures of the proposed method of sharing radio resources described in the following in accordance with exemplary embodiments of the present disclosure. Also, the processor 251 may be coupled to a memory module 256 to store software programs such as a Wi-Fi protocol module 256*a* and a LTE-U signaling module 256*b*, programming codes, device configurations, a codebook, buffered or permanent data, and so forth. The processor 251 is configured to access and execute the modules recorded in the memory module 256. The functions of the processor 251 could be implemented by using programmable units such as a micro-processor, a micro-controller, DSP chips, a FPGA, etc. The functions of the processor 251 may also be implemented with separate electronic devices or ICs, and functions performed by the processor 251 may also be implemented within the domains of either hardware or software.

The Wi-Fi protocol module 256*a* would support 802.11 (or Wi-Fi) protocol. That means the processor 251 executed the Wi-Fi protocol module 256*a* would convert a digital message into a format that is compatible with Wi-Fi protocol, and could access the WLAN. The LTE-U signaling module 256*b* would support LTE-U protocol. That means the processor 251 executed the LTE-U signaling module 256*b* would convert a digital message into a format that is compatible with LTE-U protocol, and could access the cellular network such as E-UTRAN.

In addition, the processor 251 may be used to coordinate different RATs. For example, the processor 251 may coordinate two or more RATs such as radio operations of Wi-Fi and LTE-U using the same unlicensed spectrum.

The D/A/A/D converters 252*a*~252*b* is configured to convert from an analog signal format to a digital signal format during uplink signal processing and from a digital signal format to an analog signal format during downlink signal processing.

The Wi-Fi TX 253*a* and the Wi-Fi RX 253*b* which operate at the unlicensed spectrum are respectively used for transmitting and receiving modulated signals which could be wireless RF signals (through one or more antennas 257) for Wi-Fi protocol module 256*a*. The LTE-U TX 254*a* and the LTE-U RX 254*b* which operate in the unlicensed spectrum are respectively used for transmitting and receiving modulated signals which could be wireless RF signals (through one or more antennas 257) for LTE-U signaling module 256*b*. The unlicensed spectrum operated by the Wi-Fi TX 253*a*, and the Wi-Fi RX 253*b*, the LTE-U TX 254*a*, and the LTE-U RX 254*b* may be the same or different. In addition, the Wi-Fi TX 253*a*, and the Wi-Fi RX 253*b*, the LTE-U TX 254*a*, and the LTE-U RX 254*b* may be used for sensing the transmission (of other devices such as Wi-FI devices 102*a*~102*c* and LTE-U devices 103*a*~103*c*) in the unlicensed spectrum.

The memory module 256 may be a fixed or a movable device in any possible forms including non-transitory computer readable recording medium such as a RAM, a ROM, a flash memory or other similar devices, or a combination of the above-mentioned devices.

Figure 3:
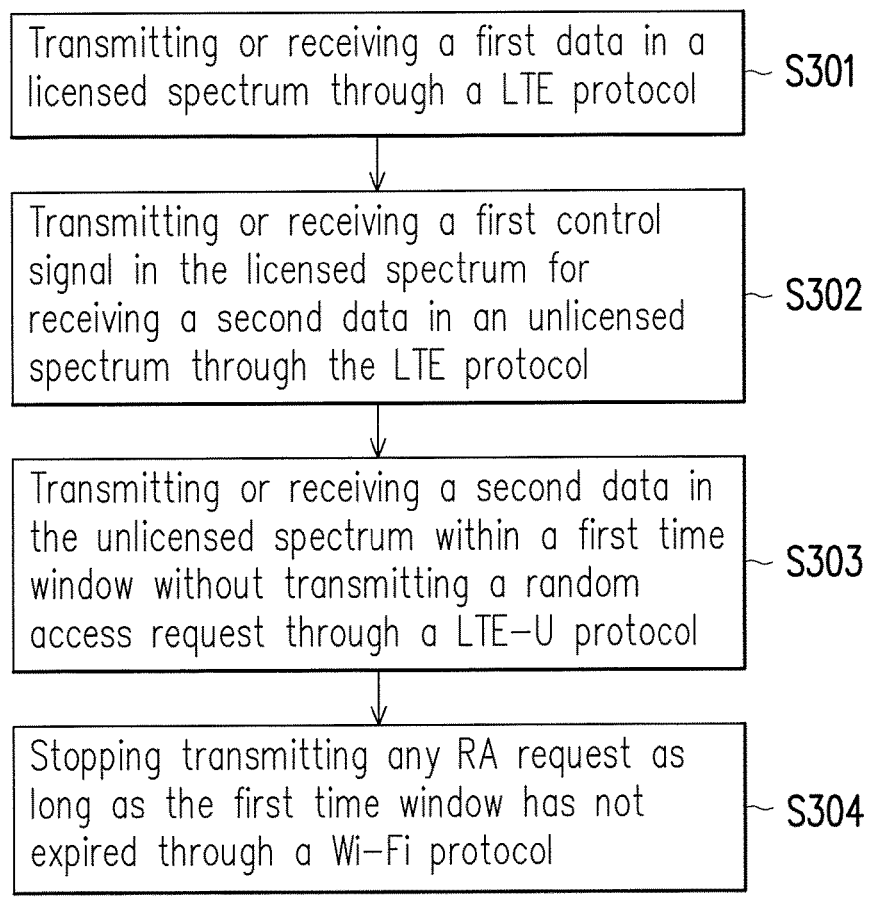
FIG. 3 is a flow chart which illustrates a method used by a user equipment for sharing radio resources for licensed-assisted access (LAA) in an unlicensed spectrum.

FIG. 3 is a flow chart which illustrates a method used by a user equipment such as LTE-U devices 103*a*~103*c* for sharing radio resources for licensed-assisted access (LAA) in an unlicensed spectrum. Referring to FIG. 3, in step S301, the processor 201 of the UE may first transmit or receive a first data in a licensed spectrum through a LTE protocol by the LTE TX 205*a* and the LTE RX 205*b* of the UE. The first data may be any format of packet, data unit, or frame which is in accordance with specification of LTE. For example, the LTE protocol module 206*c* of LTE-U device 103*a* may handle data transmission over the frequency band 1800 MHz through the LTE TX 205*a* and the LTE RX 205*b* with the BS 101*a*.

In step S302, the processor 201 of the UE may transmit or receive a first control signal in the licensed spectrum for receiving a second data in an unlicensed spectrum through the LTE protocol by the LTE TX 205*a* and the LTE RX 205*b* of the UE. The first control signal of licensed band LTE control plane may be used to configure LTE-U data plane transmission. For example, radio resource information for activating LTE-U component carrier (CC) or upcoming LTE-U data time slots is indicated by the first control message. The second data may be any format of packet, data unit, or frame which is in accordance with specification of LTE-U. In one of embodiments of the present disclosure, the first control signal may contain a duration for a first time window during which transmitting through the LTE-U protocol is available. The duration may number of timeslots or frame periods, or an actual time period such as 500 ms, 5 s, and etc.

In one of embodiments of the present disclosure, the first control signal may include a delay after which the first time window commences upon receiving the first control signal. In some scenarios, channels of the unlicensed spectrum occupied by on-going Wi-Fi transmission may be busy at an expected time to receive the first control signal for the start of LTE-U. The first control signal would be received at a later time point for possible transmission. The LTE-U data transmission may also start at a later time point.

In step S303, the processor 201 of the UE may transmit or receive the second data in the unlicensed spectrum within the first time window without transmitting a random access request through a LTE-U protocol by the LTE-U TX 203*a* and the LTE-U RX 203*b* of the UE. In the present embodiment, the contention-free service time may be used for the LTE-U operation. The first time window would be a contention-free period or service time allocated by a BS or a Wi-Fi AP 250. The UE may have data transmission with the BS or the Wi-Fi AP 250 on radio resources of LTE-U allocated by the BS or the Wi-Fi AP 250 in the contention-free period. Because the radio resources of LTE-U have been allocated by the BS or the Wi-Fi AP 250, the UE may not need to transmit a random access request for requesting the radio resources of LTE-U.

In step S304, the processor 201 of the UE may stop transmitting any random access (RA) request as long as the first time window has not expired through a Wi-Fi protocol by the Wi-Fi TX 204*a* and the Wi-Fi RX 204*b* of the UE. In time period of the first time window, the contention-free period is reserved for the LTE-U data transmissions in the unlicensed spectrum. Any Wi-Fi signal which may be transmitted over the unlicensed spectrum would not be transmitted until the time period of the first time window is expired, so as to reduce (or even avoid) collision from the Wi-Fi signal while the LTE-U data transmission is still processing.

In one of embodiments of the present disclosure, the processor 201 of the UE may receive a third control signal which comprises an end of the first time window during which transmitting through the LTE-U protocol is not available through a LTE protocol by the LTE TX 205*a* and the LTE RX 205*b* of the UE. In some scenarios, the first control signal may not contain the duration for the LTE-U data transmission. The BS or the Wi-Fi AP may transmit the third control signal to the UE for indicating that the first time window is terminated. Then, the UE would not make the LTE-U data transmission in response to receiving the third control signal.

In one of embodiments of the present disclosure, the processor 201 of the UE may receive a fourth control signal which comprises an extension of the first time window during which transmitting through LTE-U protocol is available through a LTE protocol by the LTE TX 205*a* and the LTE RX 205*b* of the UE. In some scenarios, the reservation duration indicated in the first control signal may not be long enough. The BS or the Wi-Fi AP may transmit the fourth control signal to the UE for expending the first time window. The fourth control signal is used for activating another LTE-U data session after expiration of the first time window. The fourth control signal may contain a duration of a second time window of the LTE-U data session. Or, the UE may figure out that the end of the second time window upon receiving the second control message while the third control signal does not contain the duration of the second time window.

Figure 4:
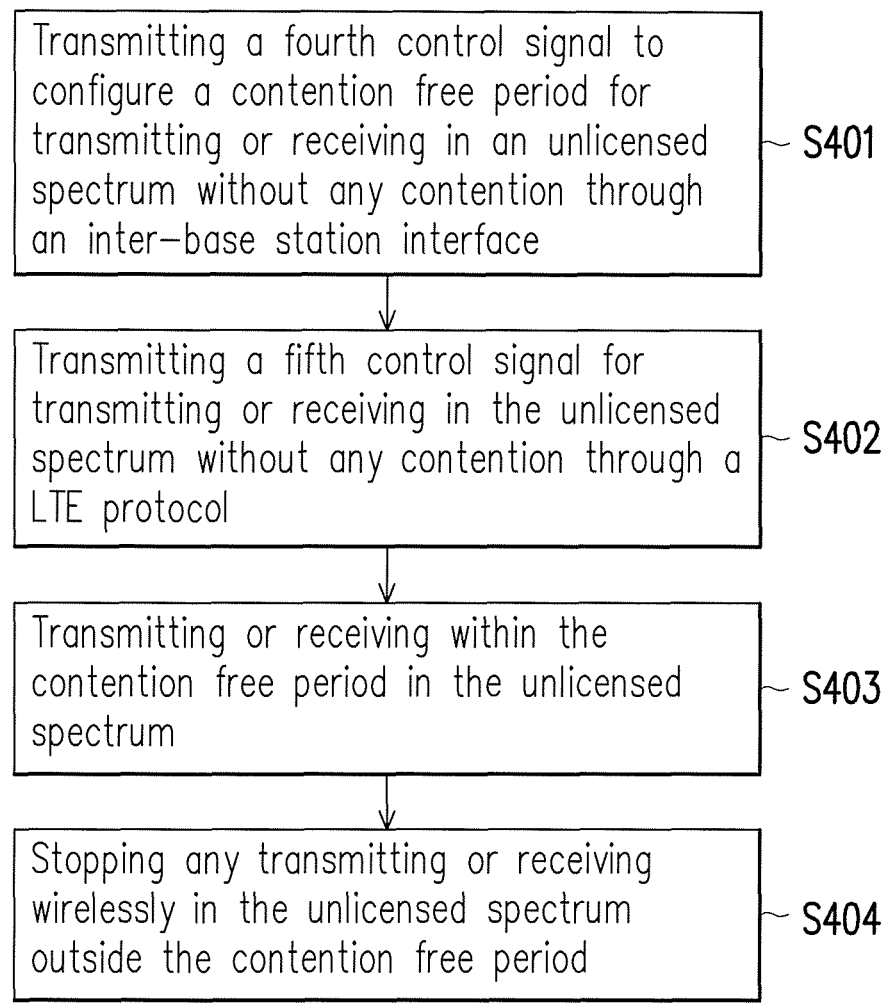
FIG. 4 is a flow chart which illustrates a method used by a base station for sharing radio resources for licensed-assisted access (LAA) in an unlicensed spectrum.

FIG. 4 is a flow chart which illustrates a method used by a base station such as the BS 101*a* and 101*b* for sharing radio resources for licensed-assisted access (LAA) in an unlicensed spectrum. Referring to FIG. 4, in step S401, the processor 201 of the BS may transmit a fourth control signal to configure a contention free period for transmitting or receiving in an unlicensed spectrum without any contention through an inter-base station interface. In the embodiment of the present disclosure, the BS may provide contention-free (CF) service along with contention-based service. The contention-free service time may be used for the LTE-U operation. The processor 201 of the BS may transmit the fourth control signal to configure the contention free period which has a predefined duration for transmitting or receiving in the unlicensed spectrum without any contention through the inter-base station interface. The processor 201 of the BS may make configuration for reserving the contention free period in the unlicensed spectrum among the LTE-U protocol module 206*a*, the Wi-Fi protocol module 206*b*, and the LTE protocol module 206*c*. The predefined duration may be a number of timeslots or frame periods, or an actual time period such as 500 ms, 5 s, and etc.

It should be noticed that before transmitting the fourth control signal, the processor 201 of the BS may detect a level of the current transmitting or receiving of the unlicensed spectrum through the Wi-Fi TX 204*a* and the Wi-Fi Rx 204*b* of the BS, and then transmit the fourth control signal only in response to the level being below a traffic threshold through the inter-base station interface. The BS may first sense the unlicensed spectrum with Wi-Fi radio. The level of the current transmitting or receiving of the unlicensed spectrum may be an indicator of traffic loading of the unlicensed spectrum. The indicator may be for example but not limited to a signal strength value, numbers of the Wi-Fi device such as the Wi-Fi devices 102*a*~102*c*, throughput information, and etc. Only when the level is blow the traffic threshold, the unlicensed spectrum would be considered as available for the LTE-U data transmission. If the unlicensed spectrum is available, the BS would start to reserve the unlicensed spectrum.

In step S402, the processor 201 of the BS may transmit a fifth control signal for transmitting or receiving in the unlicensed spectrum without any contention through a LTE protocol by the LTE TX 205*a* of the BS or through a Wi-Fi protocol by the Wi-Fi TX 204*a* of the BS. Specifically, the BS may use Wi-Fi control signal to obtain the right to access wireless medium. When obtaining the right of wireless medium access, contention-free period might also be obtained. For example, hybrid coordination function (HCF) Controlled Access (HCCA) mechanism, point coordination function (PCF) mechanism, or obtaining or allocating transmission opportunities (TXOPs) may be used to obtain the contention-free period. The contention-free period may be used for LTE-U operation. The LTE-U operation time may be the same or less than the Wi-Fi contention free period.

The Wi-Fi control message may be for example but not limited to an IEEE 802.11 Beacon message, a Request to Send (RTS) message, a Clear to Send (CTS) message, any other Wi-Fi format control message. In the fifth control message, the time duration for channel reservation may be included. The time duration of not to participate in channel contention may be set according to a time value in the Wi-Fi control message. For example, the time value may be set in the "Duration" field in the 802.11 packet. The time value may be set according to the "dot11CFPMaxDuration" (maximum contention free period duration) parameter. Or, "CFPDurRemaining" (remaining contention free duration) parameter might be set according to the intended time duration to prohibit channel contention.

Nearby Wi-Fi devices such as Wi-Fi devices 102*a*~102*c* may stop channel contention for a certain period of time, after receiving the fifth control signal, these nearby Wi-Fi devices may stop channel contention for a certain period of time which may be set in the fifth control signal.

A virtual carrier sensing mechanism may be used after receiving the fifth control signal. For example, a nearby Wi-Fi device such as Wi-Fi devices 102*a*~102*c* may set Network Allocation Vector (NAV) after receiving the fifth control message from the BS. The Wi-Fi device may decrement its NAV counter until it becomes zero, and then sense the unlicensed spectrum again.

In one of embodiments of the present disclosure, the fifth control signal may comprise a delay after which the contention free period commences upon receiving the fifth control signal. In some scenarios, channels of the unlicensed spectrum occupied by on-going Wi-Fi transmission may be busy at an expected time to receive the fifth control signal for the start of LTE-U. The fifth control signal would be transmitted at a later time point for possible transmission. The LTE-U data transmission may also start at a later time point.

In this embodiment, the processor 201 of the BS may transmit the fifth control signal to configure a UE for transmitting or receiving in the unlicensed spectrum without any contention in upcoming data time slots through a LTE protocol by the LTE TX 205*a* of the BS. The contention-free period might be used for LTE-U operation. The BS may configure LTE-U data plane such as radio resource configuration through sending control signaling in licensed spectrum LTE control plane, to activate the LTE-U data plane transmission.

In step S403, the BS may transmit or receive within the contention free period in the unlicensed spectrum. The BS may have a LTE-U data transmission with the UE such as LTE-U devices 103a~103c on radio resources of LTE-U allocated by the BS in the contention-free period.

In one of embodiments of the present disclosure, the processor 201 of the BS may transmit a sixth control signal to indicate an end of the contention free period through the inter-base station interface. In some scenarios, the fifth control signal may not contain the predefined duration for the LTE-U data transmission. The LTE-U protocol module 206a of the BS may transmit the sixth control signal to the Wi-Fi protocol module 206b of the BS for indicating that the contention free period is terminated. Then, the BS would not make the LTE-U data transmission in response to receiving the sixth control signal. The BS may explicitly send a Wi-Fi control message such as CF-End message to indicate the end of unlicensed spectrum reservation. An alternative design is waiting to the end of reservation time without sending the explicit Wi-Fi control message.

In one of embodiments of the present disclosure, the processor 201 of the BS may transmit a seventh control signal to extend the contention free period for transmitting or receiving in the unlicensed spectrum without any contention through the inter-base station interface. The seventh control signal is used for indicating another LTE-U data session after expiration of the contention free period would be started. The seventh control signal may contain a predefined duration of a subsequent contention free period of the LTE-U data session. Or, the Wi-Fi protocol module 206b may figure out that the end of the subsequent contention free period upon receiving the sixth control message while the seventh control signal does not contain the predefined duration of the subsequent contention free period.

The processor 201 of the BS may further transmit an eighth control signal to further extend the contention free period for transmitting or receiving in the unlicensed spectrum without any contention through the inter-base station interface. The transmitting of the eighth control signal occurs before the transmitting of the sixth control signal. Before the end of the subsequent contention free period or transmitting the sixth control signal, the eight control signal would be transmitted for further extending the time period if the LTE-U data transmission may be still processing and be possible of exceeding the predefined duration.

In step S404, the BS may stop any transmitting or receiving wirelessly in the unlicensed spectrum outside the contention free period. In this embodiment, any data transmission on the unlicensed spectrum would be disabling while not in contention free period. The only data transmission would be existed over the inter-base station interface between the LTE-U protocol module 206a and the Wi-Fi protocol module 206b or in the licensed spectrum.

Figure 5:
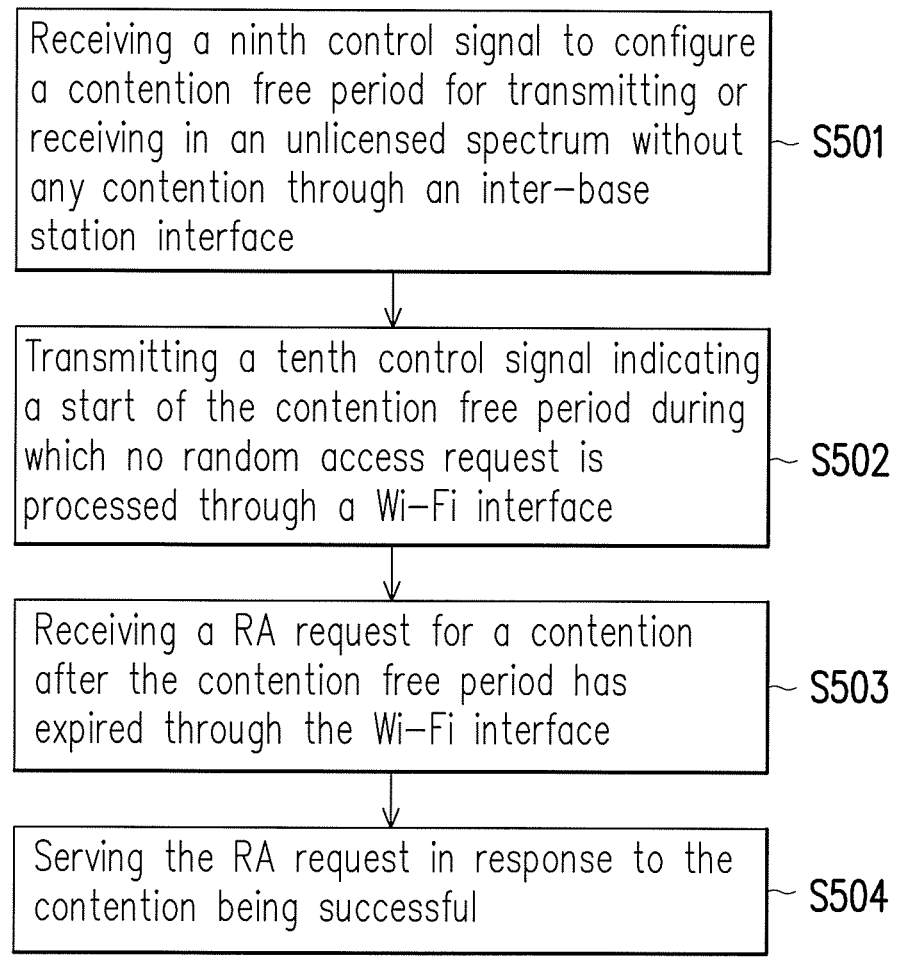
FIG. 5 is a flow chart which illustrates a method used by a Wi-Fi access point for sharing radio resources for licensed-assisted access (LAA) in an unlicensed spectrum.

FIG. 5 is a flow chart which illustrates a method used by a Wi-Fi access point for sharing radio resources for licensed-assisted access (LAA) in an unlicensed spectrum. Referring to FIG. 5, in step S501, the processor 251 of the Wi-Fi AP 250 may receive a ninth control signal to configure a contention free period for transmitting or receiving in an unlicensed spectrum without any contention through an inter-base station interface. In one of embodiments of the present disclosure, the ninth control signal further configures a duration of the contention free period. In another one of embodiments of the present disclosure, the ninth control signal may comprise a delay after which the contention free period commences upon receiving the ninth control signal. The detailed description of the step S501 and the ninth control signal may be referred to the description of the step S401 and the fourth control signal, respectively, and thus a repetition of descriptions will not be repeated.

In step S502, the processor 251 of the Wi-Fi AP 250 may transmit a tenth control signal indicating a start of the contention free period during which no random access request is processed through a Wi-Fi interface by the Wi-Fi TX 253a and the Wi-Fi Rx 253b. In one of embodiments of the present disclosure, the processor 251 of the Wi-Fi AP 250 may transmit or receive data in the unlicensed spectrum without receiving a RA request via the LTE-U protocol by the LTE-U TX 254a and the LTE-U RX 254b. In another one of embodiments of the present disclosure, the processor 251 of the Wi-Fi AP 250 may transmit a twelfth control signal to extend the contention free period. The detailed description of the step S502 and the twelfth control signal may be referred to the description of the step S402 and the seventh control signal, respectively, and thus a repetition of descriptions will not be repeated.

In one of embodiments of the present disclosure, the processor 251 of the Wi-Fi AP 250 may transmit or receive data in the unlicensed spectrum without receiving a RA request via the Wi-Fi protocol through the Wi-Fi TX 253a and the Wi-Fi Rx 253b. In some scenarios, the LTE-U data transmission may be offloaded to the Wi-Fi radio for reducing heavy traffic loading. In the contention free period, the LTE-U data transmission and the Wi-Fi data transmission may be processed with an interference mitigating mechanism such as a power control mechanism, a time division mechanism, a frequency division mechanism, and a dynamic frequency hopping mechanism.

In step S503, the processor 251 of the Wi-Fi AP 250 may receive a RA request for a contention after the contention free period has expired through the Wi-Fi interface by the Wi-Fi TX 253a and the Wi-Fi RX 253b. Without setting the duration of the contention free period, the processor 251 of the Wi-Fi AP 250 may transmit an eleventh control signal such as a Wi-Fi control message to indicate an end of the contention free period. Then, the Wi-Fi device such as the Wi-Fi devices 102a~102c may send RA message for contending radio resource of the unlicensed spectrum after the end of the contention free period.

In step S504, the processor 251 of the Wi-Fi AP 250 may serve the RA request in response to the contention being successful. In a RA procedure, a Wi-Fi device such as Wi-Fi devices 102a~102c may further be allocated a radio resource for further Wi-Fi data transmission if the Wi-Fi device contends successfully. Then, the Wi-Fi device may make the Wi-Fi data transmission with the Wi-Fi AP 250 using the allocated radio resource.

Figure 6:
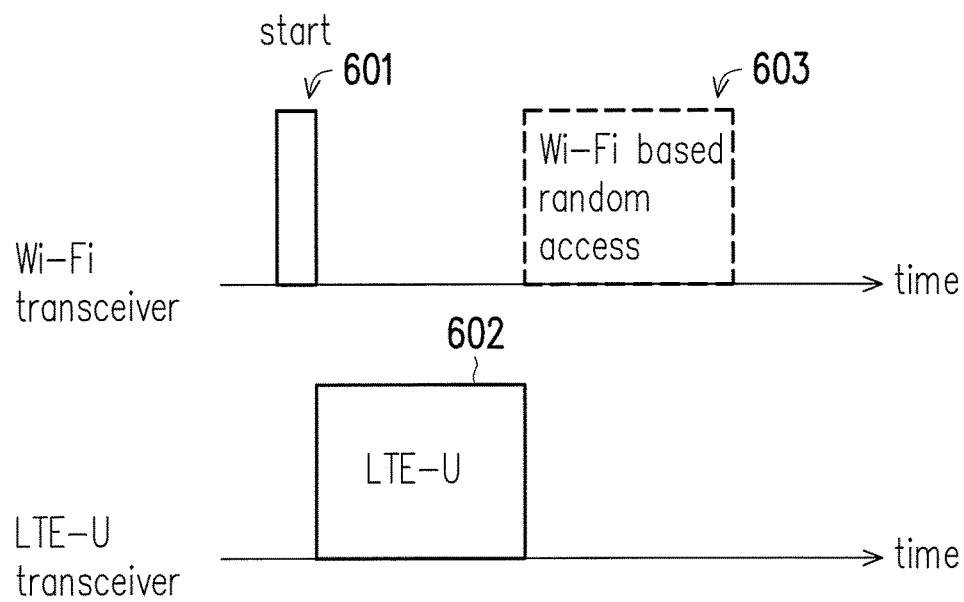
FIG. 6 illustrates a signaling mechanism used in the proposed method of sharing radio resources for licensed-assisted access (LAA) in an unlicensed spectrum in accordance with one of the exemplary embodiments of the disclosure.

FIG. 6 illustrates a signaling mechanism used in the proposed method of sharing radio resources for licensed-assisted access (LAA) in an unlicensed spectrum in accordance with one of the exemplary embodiments of the disclosure. Referring to FIG. 6, a Wi-Fi control message 601 which indicates a start of LTE-U may be transmitted by a Wi-Fi transceiver (such as Wi-Fi TX 253a and Wi-Fi RX 253b) of Wi-Fi AP 250. Upon receiving this Wi-Fi control message, other Wi-Fi devices such as the Wi-Fi devices 102a~102c may not be actively involved in the contention for random access in the shared spectrum. The Wi-Fi control message may include a time duration value to indicate the time duration that will be used for unlicensed LTE operation, so that other Wi-Fi devices may not get involved in the random access contention. The LTE-U data transmission 602 would be processed in the time duration over the unlicensed spectrum. After the expiration of the time duration, the Wi-Fi devices may start Wi-Fi-based random access procedure 603.

Figure 7:
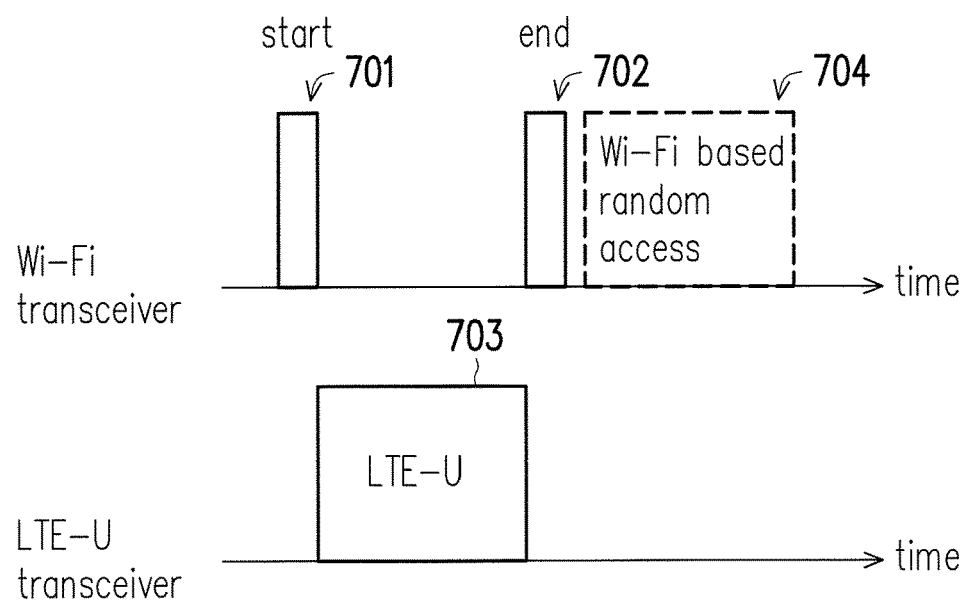
FIG. 7 illustrates a signaling mechanism used in the proposed method of sharing radio resources for licensed-assisted access (LAA) in an unlicensed spectrum in accordance with one of the exemplary embodiments of the disclosure.

FIG. 7 illustrates a signaling mechanism used in the proposed method of sharing radio resources for licensed-assisted access (LAA) in an unlicensed spectrum in accordance with one of the exemplary embodiments of the disclosure. Referring to FIG. 7, the detailed description of signaling for start of LTE-U 701 and a LTE-U data transmission 703 may be referred to the description of signaling for start of LTE-U 601 and a LTE-U data transmission 602 of FIG. 6. The difference between FIG. 6 and FIG. 7 is an explicit signaling message 702 may be sent by Wi-Fi transceiver of the Wi-Fi AP 250 to indicate the end of LTE-U communication 703. For example, CF-End message might be sent by a Wi-Fi AP to indicate the end of LTE-U communication. Upon receiving this signaling message, other Wi-Fi devices may start active communication based on the 802.11 MAC protocol.

Figure 8:
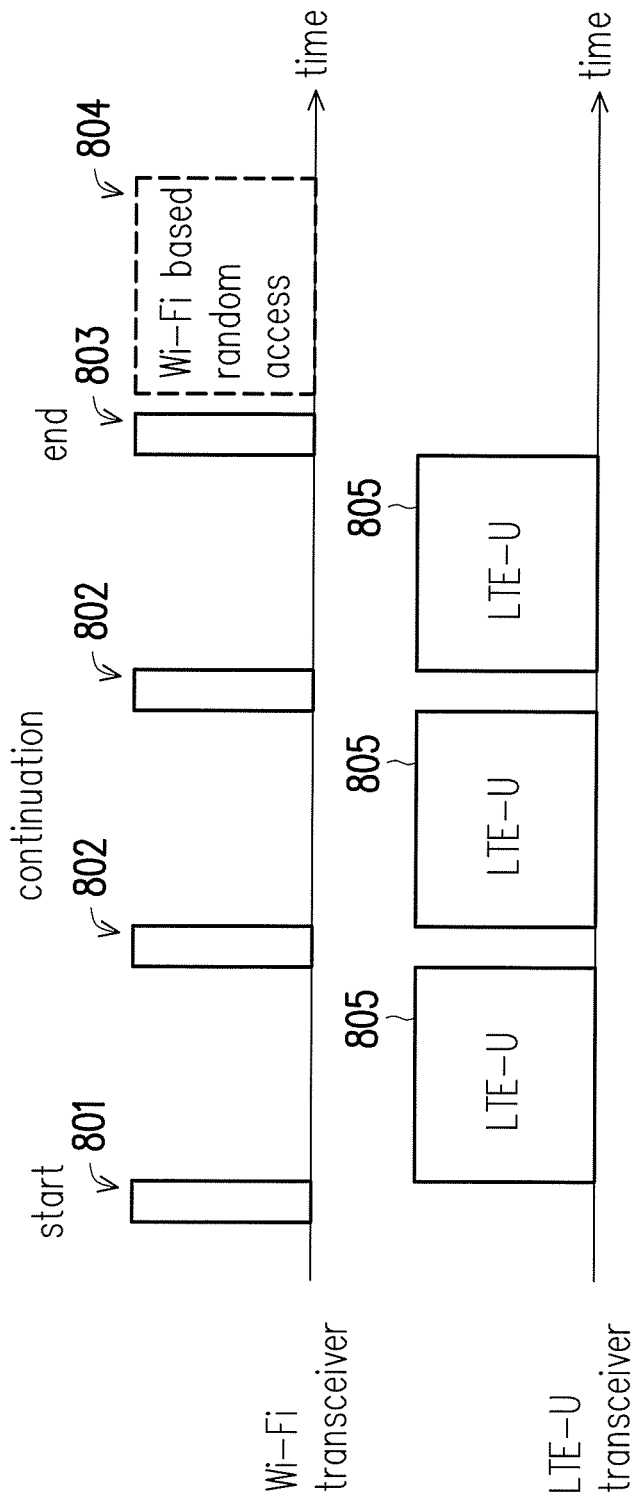
FIG. 8 illustrates a signaling mechanism used in the proposed method of sharing radio resources for licensed-assisted access (LAA) in an unlicensed spectrum in accordance with one of the exemplary embodiments of the disclosure.

FIG. 8 illustrates a signaling mechanism used in the proposed method of sharing radio resources for licensed-assisted access (LAA) in an unlicensed spectrum in accordance with one of the exemplary embodiments of the disclosure. Referring to FIG. 7, the effective reservation duration might not be long enough. For example, the LTE-U activation time might be longer than the maximum IEEE 802.11 contention free duration value. In this exemplary case, several signaling messages 802 might be used for the continuation of LTE-U communication reservation. Before the beginning of the active LTE-U session 805, a signaling message 801 is sent by Wi-Fi to reserve the spectrum (and to indicate the start of LTE-U data session). After one short LTE-U data session 805, another signaling message 802 is sent by Wi-Fi interface to reserve the spectrum (and to indicate the continuation of LTE-U data session). After the second LTE-U data session, another signaling message 802 is sent by Wi-Fi interface to reserve the spectrum (and to indicate the continuation of LTE-U data session). At the end, a signaling message 803 is sent to indicate the end of LTE-U data session. Then, nearby Wi-Fi device resume the contention-based operation for IEEE 802.11 radio access.

Figure 9:
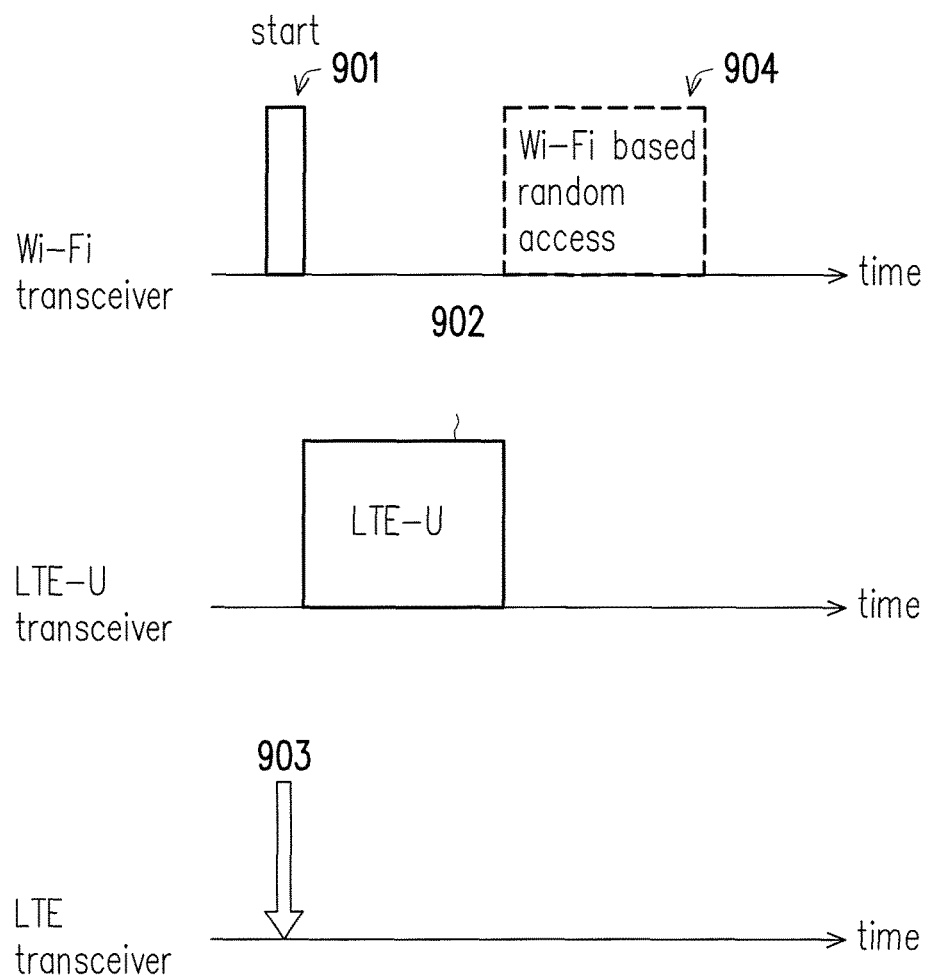
FIG. 9 illustrates a signaling mechanism used in the proposed method of sharing radio resources for licensed-assisted access (LAA) in an unlicensed spectrum in accordance with one of the exemplary embodiments of the disclosure.

FIG. 9 illustrates a signaling mechanism used in the proposed method of sharing radio resources for licensed-assisted access (LAA) in an unlicensed spectrum in accordance with one of the exemplary embodiments of the disclosure. Referring to FIG. 6 and FIG. 9, the difference between FIG. 6 and FIG. 9 is that, the LTE operation may be used for control signaling of configuring LTE-U communications. For example, a signaling message 903 may be sent to activate LTE-U data plane.

Figure 10:
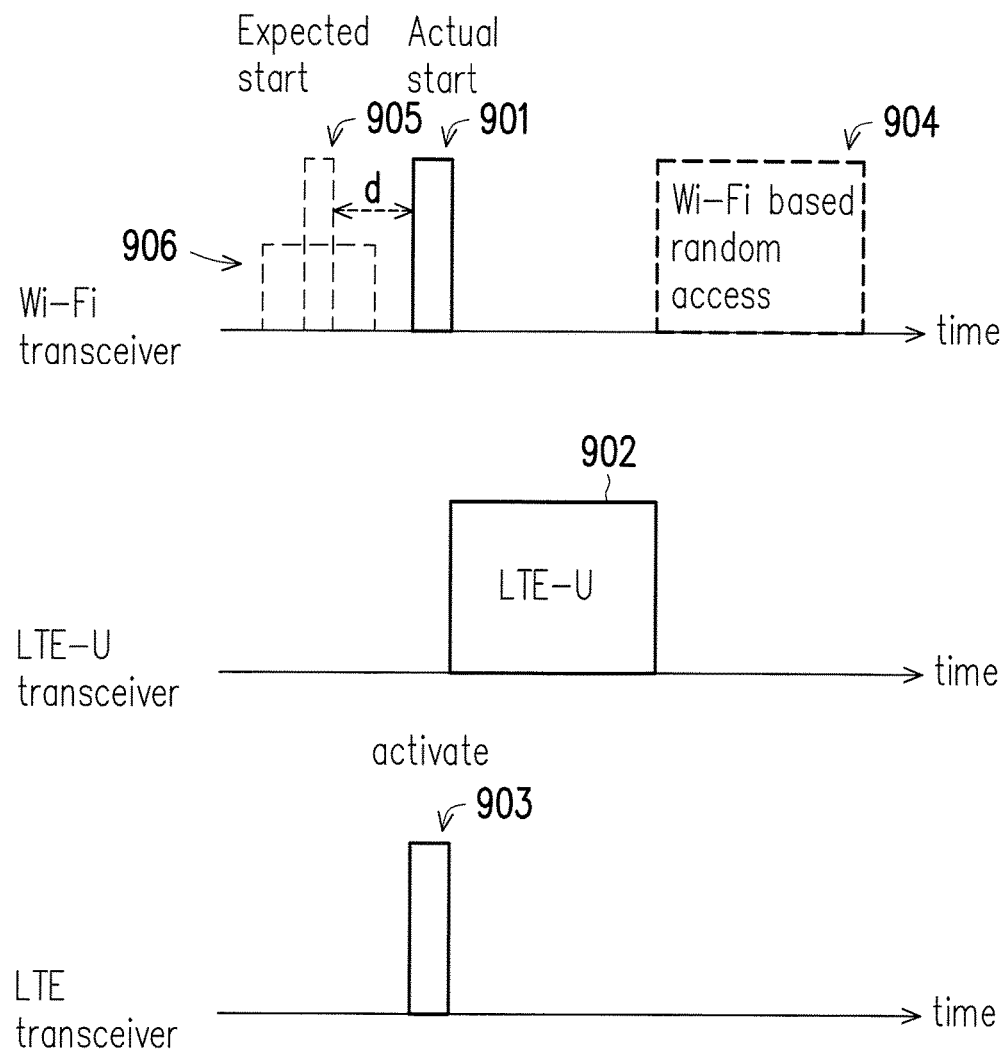
FIG. 10 illustrates a signaling mechanism used in the proposed method of sharing radio resources for licensed-assisted access (LAA) in an unlicensed spectrum in accordance with one of the exemplary embodiments of the disclosure.

FIG. 10 illustrates a signaling mechanism used in the proposed method of sharing radio resources for licensed-assisted access (LAA) in an unlicensed spectrum in accordance with one of the exemplary embodiments of the disclosure. Referring to FIG. 10, in some scenarios, there may be on-going Wi-Fi transmission when it is the expected time 905 to transmit a Wi-Fi signal for the upcoming LTE-U. In the proposed design, the BS may be configured with an expected time 905 to transmit signal for the start of LTE-U, and there may be a few other time points for possible transmission opportunities, which are later than an expected transmission time 906. The expected transmission time 906 may be another WiFi based random access transmission that cause the expected time 905 is deferred to actual time 901. The expected time 905 may be determined within the expected transmission time 906. If the channel is busy at the expected transmission time 906, the Wi-Fi signal transmission for the start of LTE-U might transmit at a later opportunity. An actual time 901 to transmit signal for the start of LTE-U may have a delay d after the expected time 905. The LTE-U data communication 902 may start at a later time point.

In view of the aforementioned descriptions, the present disclosure provides a method of sharing radio resources for licensed-assisted access (LAA) in an unlicensed spectrum and related devices using the same method. For achieving LTE-U data transmission without interfered by Wi-Fi signal over the unlicensed spectrum, a signaling message would be transmitted for reserving a contention free period in the unlicensed spectrum in the proposed method of embodiment of the present disclosure. The LTE-U data transmission would be processed within the contention free period over the unlicensed spectrum. Accordingly, the communication efficiency of LTE-U would be improved, and the proposed method may further be applied to co-existence of LTE-U and other RAT which operated at the unlicensed spectrum.

It should be noted that the adjectives "first", "second", "third", and so forth are simply used to distinguish one item or object from another and thus may or may not imply a sequence of events.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of sharing radio resources for licensed-assisted access (LAA) in an unlicensed spectrum used by a user equipment (UE), the method comprising:

transmitting or receiving, through a Long Term Evolution (LTE) protocol, a first data in a licensed spectrum;

transmitting or receiving, through the LTE protocol, a first control signal in the licensed spectrum for receiving a second data in an unlicensed spectrum;

transmitting or receiving, through a LTE-unlicensed (LTE-U) protocol, the second data in the unlicensed spectrum within a first time window without transmitting a random access (RA) request;

stopping transmitting, through a Wi-Fi protocol, any RA request as long as the first time window has not expired; and receiving, through the LTE protocol, a second control signal which comprises an extension of the first time window during which transmitting through LTE-U protocol is available;

receiving, through the LTE protocol, a third control signal which comprises an end of the first time window during which transmitting through the LTE-U protocol is not available; and receiving, through the LTE protocol, a fourth control to further extend the first time window during which transmitting through the LTE-U protocol is still available and exceeding a predefined duration for the first time window, wherein the receiving of the fourth control signal occurs before the receiving of the third control signal.

2. The method of claim 1, wherein the first control signal comprising:
a duration for the first time window during which transmitting through the LTE-U protocol is available.

3. The method of claim 1, wherein the first control signal comprises a delay after which the first time window commences upon receiving the first control signal.

4. A method of sharing radio resources for licensed-assisted access (LAA) in an unlicensed spectrum used by a base station, the method comprising:
transmitting, through an inter-base station interface, a first control signal to configure a contention free period for transmitting or receiving in an unlicensed spectrum without any contention;
transmitting, through a Long Term Evolution (LTE) protocol, a second control signal for transmitting or receiving in the unlicensed spectrum without any contention;
transmitting or receiving within the contention free period in the unlicensed spectrum;
stopping any transmitting or receiving wirelessly in the unlicensed spectrum outside the contention free period;
transmitting, through the inter-base station interface, a third control signal to extend the contention free period for transmitting or receiving in the unlicensed spectrum without any contention during an LTE-unlicensed (LTE-U) data transmission;
transmitting, through the inter-base station interface, a fourth control signal to indicate an end of the contention free period; and
transmitting, through the inter-base station interface, a fifth control signal to further extend the contention free period for transmitting or receiving in the unlicensed spectrum without any contention when the LTE-U data transmission is still processing and exceeding a predefined duration for the contention free period, wherein the transmitting of the fifth control signal occurs before the transmitting of the fourth control signal.

5. The method of claim 4, wherein transmitting, through the inter-base station interface, the first control signal to configure the contention free period for transmitting or receiving in the unlicensed spectrum without any contention comprising:
transmitting, through the inter-base station interface, the first control signal to configure the contention free period which has a predefined duration for transmitting or receiving in the unlicensed spectrum without any contention.

6. The method of claim 4, wherein before transmitting, through the inter-base station interface, the first control signal to configure the contention free period for transmitting or receiving in an unlicensed spectrum without any contention, claim 4 further comprising:
detecting a level of the current transmitting or receiving of the unlicensed spectrum; and
transmitting the first control signal only in response to the level being below a traffic threshold.

7. The method of claim 4, wherein transmitting, through the LTE protocol, the second control signal for transmitting or receiving in the unlicensed spectrum without any contention comprising:
transmitting, through the LTE protocol, the second control signal to configure a user equipment (UE) for transmitting or receiving in the unlicensed spectrum without any contention in upcoming data time slots.

8. The method of claim 4, wherein the second control signal comprises a delay after which the contention free period commences upon receiving the second control signal.

9. A method of sharing radio resources for licensed-assisted access (LAA) in an unlicensed spectrum used by a Wi-Fi access point (AP), the method comprising:
receiving, through an inter-base station interface, a first control signal to configure a contention free period for transmitting or receiving in an unlicensed spectrum without any contention;
transmitting, through a Wi-Fi interface, a second control signal indicating a start of the contention free period during which no random access (RA) request is processed;
receiving, through the Wi-Fi interface, a RA request for a contention after the contention free period has expired;
serving the RA request in response to the contention being successful;
receiving, through the inter-base station interface, a third control signal to extend the contention free period for transmitting or receiving in the unlicensed spectrum without any contention during an LTE-unlicensed (LTE-U) data transmission;
receiving, through the inter-base station interface, a fourth control signal to indicate an end of the contention free period; and
receiving, through the inter-base station interface, a fifth control signal to further extend the contention free period for transmitting or receiving in the unlicensed spectrum without any contention when the LTE-U data transmission is still processing and exceeding a predefined duration for the contention free period, wherein the transmitting of the fifth control signal occurs before the transmitting of the fourth control signal.

10. The method of claim 9, wherein the first control signal further configures a duration of the contention free period.

11. The method of claim 9 further comprising:
transmitting, through the Wi-Fi interface, a sixth control signal to indicate an end of the contention free period.

12. The method of claim 9, wherein transmitting, through the Wi-Fi interface, the second control signal indicating a start of the contention free period during which no random access (RA) request is processed further comprising:
transmitting or receiving, via the LTE-U protocol, data in the unlicensed spectrum without receiving a random access (RA) request.

13. The method of claim 9, further comprising:
transmitting or receiving, via the Wi-Fi protocol, data in the unlicensed spectrum without receiving a random access (RA) request.

14. The method of claim 9 further comprising:
transmitting a seventh control signal to extend the contention free period.

15. The method of claim 9, wherein the first control signal comprises a delay after which the contention free period commences upon receiving the first control signal.

* * * * *